United States Patent Office 3,707,522
Patented Dec. 26, 1972

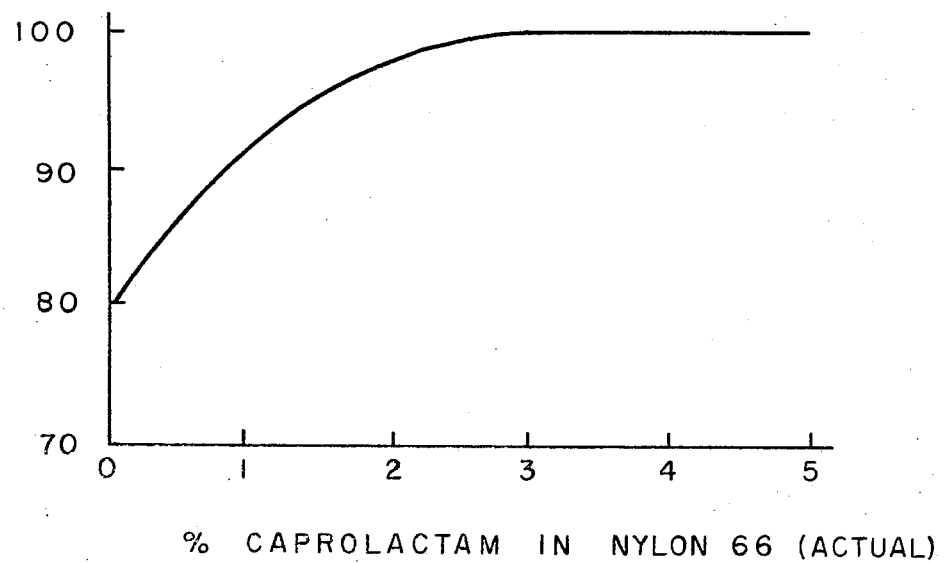
% CAPROLACTAM IN NYLON 66 (ACTUAL)

3,707,522
POLYAMIDE COMPOSITION AND PROCESS
Frank Holmes Simons, Charlotte, N.C., assignor to
Fiber Industries, Inc.
Original application June 27, 1968, Ser. No. 740,762, now
Patent No. 3,583,949, which is a continuation-in-part
of application Ser. No. 621,867, Mar. 9, 1967, now
Patent No. 3,557,544. Divided and this application
Apr. 8, 1971, Ser. No. 132,304
Int. Cl. C08g 20/20, 51/04
U.S. Cl. 260—37 N                    2 Claims

ABSTRACT OF THE DISCLOSURE

Shaped articles of a poly(hexamethylene adipamide) (nylon 6,6) fiber-forming composition is described, which articles have improved physical and chemical properties. The nylon 6,6 composition is a copolymer of primarily hexamethylene adipamide and a small but effective amount of ε-caprolactam. The amount copolymerized with the hexamethylene diammonium adipate is less than that which substantially affects normal nylon 6,6 characteristics yet is sufficient to improve processibility through spinning, drawing and beaming, dye uniformity, and mechanical quality. The continuous polymerization of the present composition is also described as well as the method of spinning said compositions.

BACKGROUND

This application is a divisional application of application Ser. No. 740,762, filed June 27, 1968, now Pat. No. 3,583,949, which in turn, is a continuation-in-part application of application Ser. No. 621,867, filed Mar. 9, 1967, now Pat. No. 3,557,544.

Nylon 6,6 is an old and well known polyamide fiber-forming polymer which has been produced commercially in the United States for many years. The fiber has numerous desirable physical and aesthetic properties which have led to its use in numerous textile and industrial applications. In the production of nylon 6,6 polymer, certain deficiencies are found in the fiber, which deficiencies have previously been compensated for by the addition of various additives, stabilizers, modifiers and the like. Numerous references can be found in the art wherein attempts have been made to modify nylon 6,6 for certain specific end uses or to form a polymer having substantially different characteristics from that of nylon 6,6. More specifically, mixtures of nylon 6,6 and nylon 6 (poly[caprolactam]) have been described in the art to produce a polyamide fiber having characteristics between those of nylon 6,6 and nylon 6. References are also found in the art for forming interpolymers and block copolymers with poly(hexamethylene adipamide) and poly(caprolactam). However, all of these references and description in the art result in the production of a polyamide which is no longer characteristically nylon 6,6 but rather a modified nylon 6,6.

It is an object of the present invention to provide a nylon 6,6 textile polyamide of improved physical and chemical properties while substantially retaining the nylon 6,6 fiber having greatly improved dye uniformity characteristics and improved processibility without the requirement of non-polyamide forming additives or modifiers. These and other objects will become apparent to those skilled in the art from a description of the invention which follows.

STATEMENT OF THE INVENTION

In accordance with the invention, a polyamide composition is provided comprising a copolymer of primarily hexamethylene adipamide with 0.2 to about 5 percent of an ω-aminocarboxylic acid or derivatives thereof of 4 or about 6 to 12 carbon atoms copolymerized therewith to a relative viscosity of 25 to 50, said composition having a crystallite morphology similar to that of poly(hexamethylene adipamide) homopolymer. The invention is also directed to the continuous polymerization of the described composition and to shaped articles produced therefrom, especially fibrous articles.

With the present invention, the nylon 6,6 fiber produced has substantially the same characteristics as conventionally produced nylon 6,6 fiber with the exception of substantially improved dyeing and mechanical qualities. Such properties are best noted in the improved dye uniformity of the fiber particularly as observed in end products such as fabrics, the runnability of the yarn during processing, particularly as noted in greatly reduced breaks and roll wraps during fiber manufacture and reduced gel formation in the polymer during spinning. While the fiber is substantially the same as nylon 6,6 certain characteristics therein are changed by the small addition of the described ω-aminocarboxylic acids. These changes in properties are particularly evident in the slight lowering of the melting point and the lowering of the specific gravity over a nylon 6,6 homopolymer, a change in the rate of crystallization and a greatly reduced tendency to gel when held at the point of incipient gelation for extended periods of time such as is incurred in the melt pool during spinning. Certain other changes, some of which are less noticeable, can be detected such as the slight lowering of the sonic velocity of the produced fiber, an increase in tensile factor which is highly desirable and a decrease in fiber modulus which is less desirable and therefore tends to limit the amount of ω-aminocarboxylic acid used.

DETAILS OF THE INVENTION

The present invention is practiced by the copolymerization of an ω-aminocarboxylic acid of 4 or about 6 to 12 carbon atoms and mixtures thereof, with hexamethylene diammonium adipate. Delta-aminovaleric acid and derivatives thereof are difficult to polymerize and therefore it is less desirable than the other mentioned ω-aminocarboxylic acids. Omega-aminocarboxylic acids and carboxylic-yielding derivatives thereof, such as the acid halides can be used as such, or, when available, the lactam which works just as well. Thus, γ-aminobutyric acid, ε-aminocaproic acid, ζ-aminoenanthic acid, η-aminocaprylic acid, θ-aminopelargonic acid, ι-aminocapric acid, κ-aminoundecanoic acid, and λ-lauric acid are conveniently used in addition to the corresponding lactams and other acid forming derivatives to produce correspondingly good results. However, ε-caprolactam has been found to be particularly effective and is therefore the most preferred. Because of the substantial preference for ε-caprolactam, the invention will be described in greater detail with particular reference to caprolactam. However, such particular reference is not to be considered as limiting the invention other than as indicated in the appended claims.

The invention will be more clearly described by reference to the drawing which is a graph illustrating the effect on spun fibers of the copolymerization product of various small amounts of the preferred ω-aminocarboxylic acid, ε-caprolactam, and hexamethylene diammonium adipate. The amount of caprolactam indicated is the actual amount incorporated into the nylon polymer in contrast to the amount introduced into the polymerization zone because not all of the lactam ends up in the copolymer. The curve indicates changes in polymer properties which result from the added lactam.

The curve represents the changes in "Durazol" dye junctions, as measured on fibers according to the test described hereinafter, for the varying amounts of ω-aminocarboxylic acid material added to the polymer. The abscissa of the coordinate ranges from about 80 at 0 percent caprolactam to 100 at the 3 percent incorporation level, 100 being the maximum obtainable on this test.

The Durazol dye test, the results of which have been shown graphically in the drawing, is a test which is used as a measure of yarn uniformity. While any dye can be used, the dye used in the present test has been selected because it is particularly sensitive to physical changes in the yarn such as draw ratio differentials, draw-twist variables and other physical properties imparted to the yarn during the spinning operation. The test is conducted, utilizing Durazol Blue 2R dye, Color Index No. 34,140, Color Index name Direct Blue 71 manufactured by Imperial Chemical Industries Limited. Produced yarn is first knitted into a fabric from which panels are made and subsequently dyed with the mentioned dye. The knitted panels are constructed so that a band of yarn to be tested is knitted next to a band of control yarn, which control yarn is an acceptable yarn based on previous tests, experiments or standards.

The knitted panels are dyed together in a standard dye bath under standard conditions wherein the dye concentration is sufficient so that only about 20 percent of the dye is exhausted from the bath during the dye procedure. This eliminates variables due to the exhaustion rate, time, et cetera. The dried dyed panels are then compared at the junction of the knit of the control yarn and the yarn being tested to determine whether there is a change in dyeability between the two yarns. A plurality of such panels is compared such as a preselected number of about 10 to 100 or more. The percent of panels which are found to be acceptable in uniformity between the control yarn and the test yarn is the rating attached to the test.

It has been found that certain improvements in polymer characteristics are obtained even at relatively small additions of ω-aminocarboxylic acid, such as about 0.2 percent incorporation. At incorporation levels beyond about 5 percent, the polymer characteristics begin to change to such an extent, particularly as measured in reduced initial modulus and melting point, that the polymer is losing basic desired nylon 6,6 characteristics. Therefore, as is pointed out most clearly by reference to the drawing, applicant's preferred range is from about 1 to 3.5 percent incorporation, at which level the most desired characteristics are achieved while minimizing the pronounced changes from nylon 6,6 characteristics, thus permitting the product to be fabricated into filaments and textiles and otherwise treated under the same conditions as nylon 6,6 homopolymer without changing machine settings and the like.

A further change, which has been pointed out above and which is not readily represented graphically as in the drawing, relates to the change in crystallization kinetics and crystallite morphology. The crystallization kinetics are best described in terms of induction time, that is the time required for the appearance of the first microscopically resolvable nuclei, and the half-life of the crystallization process, that is, the time required for the degree of crystallinity to reach 50 percent of the maximum obtainable degree of crystallinity. The crystalline morphology is best described in terms of the final spherulite size distribution. These parameters can be best described in terms of isothermal measurements taken on the polymer at a constant degree of supercooling ($\Delta T$), that is at a crystallization temperature ($T_c$) which is the prescribed $\Delta T$ below the polymer melting point ($T_m$). Briefly stated, compared to convention nylon 6,6 equivalently prepared, the composition of the present invention has an induction time that is longer, a half-life that is longer, but a crystallization morphology that is similar. Compared with previously known nylon 6,6 modifiers which affect polymeric characteristics, the crystallization rate is simply attenuated, such that the microscopic structure after all obtainable crystallization has developed is not greatly affected, particularly in terms of the number and size of the spherulites.

The effect of such changes is not clearly understood. However, it is speculated, as is borne out by certain spinning tests, that changes in the crystallization rate and crystallite morphology affect the spinning conditions and the resulting fibrous product. Thus substantial changes in crystallization rate and crystallite morphology tend to change the spinning conditions required to form desirable fibers. Various of the previously known polymer modifiers substantially affect the crystallization rate and crystallite morphology of nylon 6,6 so that the end fibrous product is affected to a degree wherein it loses basic nylon 6,6 properties. In the crystallization, all rates and times are temperature dependent. During the crystallization, all of the polymer material solidifies into contiguous domains which are called crystallites. Spherulites, when grown unhindered are spherical, birefringent aggregates of these crystallites. The final crystallite morphology is governed by two rates: (a) the rate of generation of nuclei (N), and (b) the rate of growth of nuclei into spherulties (G). The final average volume of individual spherulites can be approximately expressed by the ¾ power of the ratio of the spherulitic growth rate over the nucleation rate: $(G/N)^{3/4}$. Assigning an arbitrary value of 1.0 to this ratio for nylon 6,6 homopolymer, it has been observed that a larger value, that is a value above 1.0, results in the formation of a smaller number of larger spherulites when measured on the polymer under controlled crystallization conditions. When the ratio is smaller, that is less than 1.0, the result is the formation of a larger number of smaller spherulites. The induction period and half-life appear to have no effect on the final crystallite morphology and only reflect changes in the overall rate of crystallization, but they may be important to spinning conditions.

The present invention results in a crystallite morphology which closely resembles that of nylon 6,6 homopolymer. Both the nucleation rate and the growth rate are attenuated by the presence of the copolymerizing component, but their resulting ratio is virtually unaffected. Thus the spehrulite size distribution is about the same as that of the homopolymer in the pure state, that is without extraneous those including nucleating agents, result in a ratio value that is substantially smaller, thus resulting in a larger number of smaller spherulites in the end product. Such changes as noted above are evident, primarily in the crystallite morphology. The crystallite morphology is best described with reference to that of another polymer and compared under the same set of experimental conditions. Thus, the present invention is readily distinguished from prior art copolymers, because it has a spherulite size distribution similar to that of the homopolymer nylon 6,6.

Comparison of the presently described copolymer with nylon 6,6 homopolymer is best accomplished with the homopolymer in the pure state, that is without extraneous additives which greatly affect nucleation. However, conventional noninterfering additives such as $TiO_2$ can be present in the homopolymer and/or the presently described polymer and yet obtain a conclusive result.

The comparative tests are carried out as follows: The melting point of the polymer is accurately measured, such as on a Perkin Elmer Differential Scanning Calorimeter, Model 1B. The melting point determination uses a sample of polymer chips which is heated at a 20 degrees centigrade increase per minute to 200 degrees centigrade, then at a 5 degrees centigrade increase per minute to a temperature 15 degrees centigrade above the noted melting point. On reaching this temperature the sample is cooled at 5 degrees centigrade per minute to a temperature 15 degrees centigrade below its crystallization point. The temperature is then raised again at 5 degrees centigrade per minute and the melting point therein noted is used in subsequent crystallization studies. This procedure is used to give all samples approximately the same thermal history.

In order to compare the crystallization kinetics and crystallite morphology of the present invention the following procedure is used: Sections 100 microns thick of polymer chip are melted between two cover slips on the hot plate at 300 degrees centigrade for 30 minutes. The sample is then rapidly transferred to the hot stage of a polarizing microscope which is controlled at a desired crystallization temperature to within 0.2 degree centigrade, which temperature is set for 5, 10, 20, etcetera degrees below the measured melting point, as is desired. The depolarization of the light passing through the crystallizing sample as the birefringent spherulites grow is followed with a photomultiplier mounted in the microscope eypiece. The output of the photomultiplier is automatically recorded. Photographs are taken at the end of the crystallization and enlarged for measurements of the spherulite size distribution. An area of 30 x 300 microns is selected and the average volume of 20 typical spherulites calculated from their radii.

Immediately after transfer of the polymer sample from the hot plate to the hot stage of the microscope, the amorphous polymer melt shows a uniformly dark field when viewed through crossed polarizers corresponding to "zero" photomultiplier output. A finite induction time elapses during which no depolarization of transmitted light occurs. With the observable onset of crystallization, the photomultiplier output increase almost exponentially to a maximum rate at the half-life of the process, after which the rate decreases and falls off asymptotically to a pseudo quilibrium level. The half-life is conveniently read from the recording of the photomultiplier output.

For measurements of nucleation rate and spherulitic growth rate, the photomultiplier is replaced by a camera and photographs are taken at specified time intervals during the crystallization. The photographs are subsequently enlarged for more convenient measurement of the number of nuclei per unit volume per time and of the radial growth rate of the spherulites.

Microphotographs of crystallized nylon 6,6 homopolymer, crystallized as described, compared to microphotographs of the presently described polymr at the same enlargement and crystallized under the same conditions are found to be similar and to have an average crystallite morphology of substantially the same.

The crystallite morphology of the polymer of the present invention, as measured in accordance with the describd methods, results in an average spherulite volume of greater than about $2 \times 10^{-8}$ cubic centimeters and preferably greater than about $4 \times 10^{-8}$ cubic centimeters as measured at a supercooling temperature of 20 degrees centigrade below the measured melting point of the polymer. The ratio of radial spherulitic growth rate over nucleabout $10^{-8}$ cubic centimeters measured at the noted supercooling temperature.

The present invention is particularly adaptable to the various known methods of polymerizing polyamide compositions. The compositions of the present invention can be made under either batch type polymerization methods, as are conventionally employed in the art, or as is often more preferable, under recently developed continuous polymerization methods. The utilization of polymeric compositions in accordance with this invention is especially advantageous in obtaining the benefit of continuous polymerization techniques, which may be a function of the morphological differences noted hereinabove such as reduced gel formation.

In the polymerization, the ε-caprolactam is added to the hexamethylene diammonium adipate salt solution (noraly about 48 percent in water) prior to polymerization or during polymerization as may be most convenient for the particular production method. Independent of the process point at which the ε-caprolactam is added, the addition is made at a point in time whereby it becomes thoroughly polymerized into a random copolymer structure with the hexamethylene diammonium adipate material. Normally, it is most convenient to add the ε-caprolactam in the initial phases of the polymerization reaction, such as prior to developing substantial heat and pressure on the reaction mixture, particularly just prior to developing autogenous pressure on the reaction mixture. In this manner the aminocarboxylic acid is incorporated into the polymer in a random manner.

As will be noted from the examples, a certain loss of caprolactam is experienced during polymerization, as measured in the end polyamide, depending upon the particular processing techniques utilized. Thus, whereas 3 percent by weight of ε-caprolactam is added to the polymerization stage, a somewhat lower quantity of polycaprolactam is actually incorporated into and detected in the end product due to volatility losses in processing, incomplete polymerization etc.

The more conventional batch method of polymerizing fiber-forming polyamides is effected by linear condensation of the bifunctional reactants under polymerization conditions with the removal of volatile reaction products, such as the produced water and excess water normally accompanying the hexamethylene diammonium adipate materials. More particularly. batch polymerizations are normally carried out by heating the adipate salt solution and the added ε-caprolactam in a closed system until a pre-designated temperature and pressure are reached such as about 250 pounds per square inch and a temperature of about 230 to 280 degrees centigrade. The polymer may then be held at the elevated temperature and pressure for a period of time to increase the relative viscosity to the desired range. The autogenous pressure is retained about constant during the later stages of polymerization by releasing volatile products such as water and unreacted starting material while the temperature is increased to the higher noted levels. Finally, the pressure is entirely released or a vacuum is drawn and the remaining volatiles are removed from the reaction mixture.

Continuous processing techniques utilize specially designed reactors which are capable of continuously passing the reaction mixture through a heated zone such as a tubular passage, wherein the product is contained under sufficient pressure to reach the polymerization temperatures. After being retained in the reaction zone by control of the polymer flow rate at the desired temperature and pressure to achieve the desired degree of polymerization as measured by relative viscosity, the polymer product is passed to a lower or atmospheric pressure zone thereby volatilizing the unreacted materials and water of reaction from the polymer composition. To achieve higher relative viscosities, subatmospheric pressure can be used in the later stages of the polymerization.

The amount of ω-aminocarboxylic acid or derivative added to the polymerization process is such that the end composition contains about 0.2 to about 5 percent incorporated ω-aminocarboxylic acid as part of the polymer. Depending on the type of polymerization, that is batch or continuous, the polymerization conditions and temperature-pressure profile, the loss of aminocarboxylic acid material from the reaction can be as high as about 50 percent and more commonly in the range of 30 to 40 percent.

The polyamide compositions of the present invention may also contain the usual nylon 6,6 additives such as plasticizers, delustrants, such as $TiO_2$, heat and light stabilizers such as copper, iodides, manganese, phosphates and the like compounds, optical brightening agents, polymerization aids, catalysts, colorants, and the like. For example, nylon yarns often contain titanium dioxide as a delustrant in an amount of up to about 2 percent.

As noted above, the polymerization of the polyamide forming composition is carried out to result in a relative viscosity suitable for the particular end use. The present invention is directed primarily to textile end uses and therefore the relative viscosity is preferably less than about 50 and generally in the range of about 25 up to 50. More preferably, the relative viscosity is in the range of about 32 to 45.

Relative viscosity, as noted herein, is measured in the conventional manner by determining the ratio of the viscosity of a solution of a given strength of the polyamide in a given solvent to the viscosity of the solvent itself at the same prescribed temperature. The relative viscosity values noted herein utilize 90 percent by weight of aqueous formic acid as the solvent. The efflux time of an 8.4 percent by weight solution of the polyamide in the formic acid solvent is determined and the ratio of said viscosity to the efflux time of the solvent itself is the measure of relative viscosity as determined by the equation:

$$RV = \left(\frac{t \text{ solution}}{t \text{ solvent}}\right) - 1 \quad 100$$

The temperature employed for the determination of these viscosities is 25 degrees centigrade.

On completion of the polymerization reaction, the normal procedure for batch processes involves extruding the polymer from the reactor in sheet form and subsequently grinding the sheet into chips. The chips can then be stored or immediately used in the spinning process. Alternatively, as is best effected in continuous polymerizations, the polymerized product is directly passed in molten form to the spinning process for the formation of filaments, films, fibrillated products, molded articles and the like.

The spinning of the composition of the present invention can be effected under modified conventional spinning techniques. Because of certain changes in the composition characteristics as noted herein, the spinning process is desirably modified to accommodate these changed characteristics. For instance, the melting point of the resulting polymer is slightly depressed from the conventional melting point of about 264 degrees centigrade for nylon 6,6 homopolymer. Thus, depending upon the amount of aminocarboxylic acid added, the melting point for a polymer having a relative viscosity within the above desired textile range will be depressed by an amount ranging from about 0.4 degree for the lower amounts of aminocarboxylic acid up to about 10 degrees centigrade for the larger amounts. The melting temperature required in the spinnerette can be correspondingly reduced. Secondly, the reduction in temperature further increases the time at which the melt can be held at spinning temperatures without degradation and gel formation.

A further characteristic which is particularly noticeable with the present composition under spinning conditions is the greatly reduced tendency to form gel in the melt state. This reduction in the tendency to gel is also considered to contribute to the uniformity of the resulting yarn because less partially-formed gel material is extruded in admixture with the polymer melt, thereby reducing the amount of yarn having portions of gelled material intermingled with acceptable melt material.

A further spinning characteristic and consequent modification in the spinning technique is detected in the increased elongation of the yarn compared to nylon 6,6 homopolymer. The increased elongation consequently preferably requires an increase in the draw ratio applied to the yarn to produce an end product having correspondingly equivalent fiber properties. The increase in elongation appears to be proportional to the increase in the aminocarboxylic acid copolymerized with the nylon 6,6. The yarn tenacity is also improved along with the higher elongation. This results in a highly desired improvement in tensile factor as represented by the equation $TE^{1/2}$ wherein T is the tensile strength at the breaking point of the fiber in grams per denier and E is the elongation in percent at the break. See ASTM test number D2256.

A lower initial modulus is also noted in the yarn compositions of the present invention. This lower modulus reflects a more compliant or less stiff and softer yarn than the homopolymer nylon 6,6. However, too great a lowering of the modulus is to be avoided because of lesser abrasion resistance and the like. Thus, the amount of $\omega$-aminocarboxylic acid added is limited as described herein.

A further slight variation in yarn characteristics is the slightly higher shrinkage under both hot-dry and hot-wet conditions compared to homopolymer nylon 6,6 as determined by ASTM test number D2259. This change is sufficiently slight so as not to be of much significance in the end product.

All of the above factors, such as increase in elongation, increase in tenacity, reduction in gel count and consequent improved yarn consistency, higher draw ratios to correspond to the increase in elongation and the further factor of higher yarn to metal friction characteristics contribute to the totally improved runnability of the yarn. Direct measurements of the improved runnability are readily noted in the reduction in filament breaks and roll wraps per pound of yarn processed and the like measurements of runnability.

Fabric constructed from the yarn produced using a composition of the present invention is found to have greatly improved dye uniformity over yarn of the nylon 6,6 homopolymer. This is particularly noted by the lack of streaks and other defects which are accentuated by the yarn in the dyed fabric product. It is believed that the increased microscopic uniformity of the crystalline structure of the polymer of the present invention results in a yarn of greater uniformity which consequently dyes more uniformly and is less sensitive to process variations, for example yarn cooling rate.

The invention will be more fully described by reference to the following examples which illustrate certain preferred embodiments of the present invention. Unless otherwise indicated, all temperatures are in degrees centigrade and all parts are by weight.

EXAMPLE I

The composition of the present invention was made in accordance with a batch polymerization wherein 0.6 percent of $\epsilon$-caprolactam was incorporated into the end polymer. The polymerization was effected by charging an autoclave with 4,735 parts of 47 weight percent hexamethylene diammonium adipate solution in water (nylon 6,6 salt solution), 37 parts of 60 weight percent $\epsilon$-caprolactam solution, 4.7 parts of 60 percent hexamethylene diamine solution and 3.8 parts of 25 percent acetic acid. The autoclave was sealed and the temperature raised to about 235 degrees centigrade with agitation. At this temperature, 100 parts of $TiO_2$ (40 percent milled dispersion) was added. The heating was continued to a temperature of 244 degrees centigrade.

When the pressure reached 250 pounds per square inch gauge, boiling commenced in the autoclave. The boiling was maintained while the pressure was gradually reduced to atmospheric over a period of about 30 minutes. Heating was continued for another 20 minutes and then the pressure was increased to about 55 pounds with heating. The increased pressure was maintained for another 30 minutes. The reaction was terminated at a relative viscosity of about 45. The polymerized product was extruded from the reactor in the form of a heavy ribbon which was then cut into chips. Analysis of the crystallite kinetics and morphology of the chips indicated that the polymer had a crystallization induction time of 1.6 minutes, a half-life of 3.0 minutes and an average spherulite volume of $5.8 \times 10^{-8}$ cubic centimeters, at a supercooling temperature of 20 degrees centigrade below the melting point. The polymer had incorporated therein, in a random polymerization, 0.6 weight percent of the caprolactam material. The melting point of the polymer was about 263 degrees centigrade.

The chip polymer was subsequently melt spun and draw twisted to 70/13 Z twist yarn utilizing conventional heated grid spinning apparatus. The initial modulus of the fiber was found to be about 44.5 units, the Durazol Dye Junction Test indicated about 90 percent equal to the standard, the tensile factor $TE^{\frac{1}{2}}$ was about 34 and the boiling water shrinkage was about 9.2 percent.

EXAMPLE II

Another nylon 6,6 polymer composition of the present invention was produced having 1.8 weight percent of caprolactam incorporated therein using the method of Example I. The amount of ε-caprolactam added to the polymerization reaction was in an amount equal to about a 65 percent excess of that actually incorporated. The chip product produced was analyzed and found to have 1.8 percent of incorporated caprolactam, a crystallite induction time of 1.9 minutes, a half-life of 3.9 minutes, and an average spherulite volume of $5.3 \times 10^{-8}$ cubic centimeters at a supercooling temperature of 20 degrees centigrade below the measured melting point of 260 degrees centigrade.

Fibers melt spun from the produced chip and draw-twisted to 70/13 Z twist yarn were found to have an initial modulus of about 43, a Durazol Dye Junction of about 98 percent equal to the standard, a tensile factor $TE^{\frac{1}{2}}$ of about 34.9 and a boiling water shrinkage of about 9.6 percent.

EXAMPLE III

A nylon 6,6 composition was produced in accordance with the present invention having incorporated therein about 3 percent caprolactam in the end product. The reaction of Example I was followed wherein the calculated amount of ε-caprolactam added to the polymerization reaction was 5 percent. Again, the polymer was polymerized to a relative viscosity of about 45 and the polymer extruded in sheet form and subsequently chopped into chips.

The chips were analyzed and found to have the equivalent of 3 percent caprolactam incorporated. The induction time for the polymer was found to be 2.2 minutes and its half-life was 4.6 minutes, with an average spherulite volume of $5.4 \times 10^{-8}$ cubic centimeters at a supercooling temperature of 20 degrees centigrade below the measured melting point of 259 degrees centigrade.

Filaments were produced from the chip by melt spinning and draw-twisted to 70/13 Z twist yarn using a grid type spinning apparatus. The filaments spun from this composition had an initial modulus of about 39, a Durazol Dye Junction Test rating of 100 percent acceptance, a tensile a factor $TE^{\frac{1}{2}}$ of about 45, and a boiling water shrinkage of about 10 percent.

Dye tests conducted on fabric produced from the fibers indicated that the dye uniformity was substantially improved as borne out by the improvement in the Durazol Dye Junction Test.

EXAMPLE IV

In the same manner a nylon 6,6 composition containing 5 percent of incorporated aminocarboxylic acid material such as ε-caprolactam is produced in accordance with Example I with correspondingly good results.

In the same manner other ω-aminocarboxylic acids are used in amounts of 0.2 to 5 percent, copolymerized as in Example I to produce polyamide compositions having correspondingly improved physical and chemical properties. In particular, 1 to about 5 percent of γ-butyrolactam, ζ-enantholactam, η-aminocaprylic acid, θ-aminopelargonic acid, ι-aminocapric acid, κ-aminoundecanoic acid, and λ-aminolauric acid and derivaties thereof conveniently copolymerized with aqueous salt solution of hexamethylene diammonium adipate in the reaction conditions described in Example I to produce correspondingly good results.

EXAMPLE V

The preferred method of polymerizing the polyamide composition of the present invention is by a continuous polymerization reaction. A nylon 6,6 polyamide composition having incorporated therein 1.8 percent ε-caprolactam was produced by metering solutions of reactants in the desired proportions to a continuous polymerizer constructed in accordance with the description in U.S. Pats. Nos. 3,193,535, 3,258,313, and 3,278,494.

More specifically, the reaction was carried out by feeding hexamethylene diammonium adipate 47 percent salt solution at a rate of 304 parts per hour on the dry weight basis, 3.6 parts per hour of hexamethylene diamine on the dry weight basis, 8.4 parts per hour of ε-caprolactam on the dry basis and 0.1 part per hour of acetic acid to the continuous polymerizer. A delustrant, $TiO_2$, was also added in an amount of 0.9 part per hour on the dry basis in a milled, dispersion form. The reaction mixture metered to the tubular reactor was immediately subjected to a temperature of about 288 degrees centigrade and an autogenous pressure of about 250 pounds per square inch gauge. The high polymerization temperature and resulting vaporization of the water in the feed solutions resulted in high initial pressures in the continuous polymerizer. On progressing through the reactor, the pressure was gradually reduced to atmospheric at the exit end of the reactor. The polymer progressed through the polymerizer at a rate resulting in an average residence time of about 35 minutes. Polymer having a relative viscosity of about 40 was continuously removed from the polymerizer and directly fed to fiber spinning columns.

Alternatively, the resulting polymer could be formed into chips for subsequent extrusion. Product produced by the continuous polymerization had properties similar to those described for Example II which are further illustrated in the drawing.

EXAMPLE VI

Nylon 6,6 homopolymer was produced utilizing the continuous polymerization method of Example V wherein ω-aminocarboxylic acid material was added to the reaction mixture. The same reaction procedure was again followed utilizing 47 percent hexamethylene diammonium adipate solution. The feed rate of reactants was adjusted to compensate for the lack of the addition of caprolactam. Therefore, the continuous polymerizer was fed at a rate of 312 parts per hour of nylon 6,6 salt solution on a dry basis. The corresponding flow of hexamethylene diamine was 4.1 parts per hour on the dry basis. The acetic acid and $TiO_2$ feed rates were maintained the same. The resulting polymer was polymerized to a relative viscosity of 40.

Analysis of this polymer indicated that fibers spun therefrom had an initial modulus of about 45, a Durazol Dye Junction of 80, a melting point of about 264 degrees centigrade, a tensile factor $TE^{\frac{1}{2}}$ of about 33.4 and a boiling water shrinkage of about 9 percent.

EXAMPLE VII

The polymers of Examples V and VI were compared by melt spinning the polymers using conventional spinning apparatus to form 70/13 Z twist textile yarns. Tests on the runnability of this yarn and comparisons thereof are set forth in Table I wherein a low number rating is the most desirable except for Durazol Dye Junctions wherein 100 is the most desirable rating.

TABLE I

| | Nylon 6,6 homopolymer of Example VI | Nylon 6,6 with 1.8% caprolactam, Example V |
|---|---|---|
| Draw twist break rating | 4.6 | 2.5 |
| Draw roll wrap rating | 2.1 | .5 |
| Yarn defect rating | 6.2 | 0.9 |
| Dyed yarn streak rating | 1.4 | 1.1 |
| Durazol Dye Junctions (± 0.5) percent | 81 | 98 |

The substantial improvement in the runnability of the nylon material of the composition of the present invention illustrated in Example V is immediately evident.

While there have been described various embodiments of the present invention, the methods and compositions described herein are not intended to be understood as limiting the scope of the invention as it is realized that changes therein are possible. It is intended that each element recited in any of the following claims is to be understood as referring to all equivalent elements for accomplishing substantially the same results in substantially the same or equivalent manner. It is intended to cover the invention broadly in whatever form its principles may be utilized, being limited only by the appended claims.

What is claimed is:

1. A filament of a polyamide composition consisting of a copolymer of 95 to 99.8% hexamethylene diammonium adipate with $\epsilon$-caprolactam in an amount of 1 to 3.5% weight percent copolymerized therewith to a relative viscosity of 25 to 50, as measured in an 8.4 solution of 90% aqueous formic acid at 25° C., said composition having an average crystallite morphology substantially the same as that of polyhexamethylene adipamide homopolymer, said filament containing $TiO_2$ as a delustrant.

2. A yarn comprising the filaments of claim 1.

References Cited
UNITED STATES PATENTS

| | | | |
|---|---|---|---|
| 3,002,947 | 10/1961 | Maple | 260—37 |
| 3,557,544 | 1/1971 | Simons | 57—140 |
| 3,583,949 | 6/1971 | Simons | 260—78 |

MORRIS LIEBMAN, Primary Examiner

R. ZAITLEN, Assistant Examiner

U.S. Cl. X.R.

260—37 NP, 78 A, 78 L